United States Patent [19]
Emerick

[11] 4,369,279
[45] Jan. 18, 1983

[54] LOW-TEMPERATURE CURING POLYSILOXANE COATING COMPOSITION WITH FLUOROCARBON

[75] Inventor: Dennis P. Emerick, Aston, Pa.

[73] Assignee: E. I. Du Pont de Nemours and Company, Wilmington, Del.

[21] Appl. No.: 313,590

[22] Filed: Oct. 21, 1981

[51] Int. Cl.$^3$ .............................................. C08K 5/54
[52] U.S. Cl. .................................... 524/267; 524/315; 524/317; 524/445; 525/101; 525/104
[58] Field of Search ............................ 525/101, 104; 260/33.6 EP, 33.6 F, 33.6 SB, 33.2 R, 33.2 SB, 33.2 EP, 33.4 EP, 33.4 F, 33.4 SB; 524/267, 315, 317, 445

[56] References Cited

U.S. PATENT DOCUMENTS

| | | | |
|---|---|---|---|
| 3,780,132 | 12/1973 | Lohr | 525/101 |
| 4,121,000 | 10/1978 | Wald | 260/29.1 SB |
| 4,252,702 | 2/1981 | Wald | 260/29.1 R |
| 4,324,715 | 4/1982 | Emerick | 523/400 |

Primary Examiner—Melvyn I. Marquis

[57] ABSTRACT

A coating composition based on a polysiloxane resin-forming precondensate, an epoxy resin, a fluorocarbon copolymer and a multifunctional amine catalyst provides non-stick coatings that can be cured at low temperatures such as 107° C.

3 Claims, No Drawings

LOW-TEMPERATURE CURING POLYSILOXANE COATING COMPOSITION WITH FLUOROCARBON

BACKGROUND

Low temperature curing coating compositions of silicones and epoxies are disclosed in U.S. Pat. No. 4,252,702—Wald (Feb. 24, 1981), however, they do not have optimum nonstick or release properties.

Similar coating compositions but also containing fluorocarbon resins are disclosed in U.S. Pat. No. 4,121,000—Wald (Oct. 7, 1978), but they do not cure at as low temperatures, using 325° C. in the examples.

It is desirable to have available nonstick coatings which cure at much lower temperatures than the 325° C. of the latter patent. For instance, lower curing temperatures can facilitate use of such coatings on large metal objects adapted for internal heating such as by steam when the heat source is temperature limited.

SUMMARY OF THE INVENTION

The present invention provides a coating composition comprising:
(a) a binder comprised of
(1) 40–99%, preferably 80–90%, more preferably about 84%, based on the weight of the binder, of a polysiloxane resin-forming precondensate which has one or more of the units

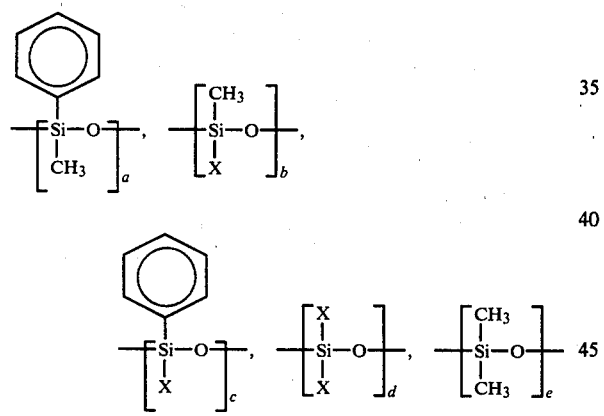

wherein
X is a functional group which allows crosslinking at its site, and
a, b, c, d and e are of a magnitude and in proparations which provide the resin with a degree of substitution, measured as the ratio of phenyl plus methyl groups to silicon atoms, of a least about 1.0, and a ratio of phenyl groups to silicon atoms of at least about 0.3,
and which has a silanol content above 4%, based on the weight of the precondensate; and
(2) 1–40%, preferably 10–20%, more preferably about 16%, based on the weight of the binder, of an epoxy resin having the formula

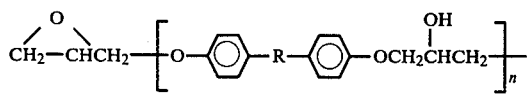

-continued

[structure continued]

wherein
n is an integer from 0–42, and
R is an alkylene group of 1–4 carbon atoms;
(b) 5–60%, preferably 25–35%, more preferably about 33%, based on the weight of the binder, of a fluorocarbon copolymer of tetrafluoroethylene and hexafluoropropylene containing by weight about 8–25, mole percent hexafluoropropylene;
(c) 0.1–5%, preferably 1–3%, based on the weight of the binder, of a multifunctional amine catalyst;
(d) 0.2–10%, based on the weight of the binder, of a silicone fluid which is a dimethyl polysiloxane fluid having a viscosity of 50–5000 centistokes measured at 25° C.; and
(e) a inert liquid carrier.

DETAILED DESCRIPTION

The use of multifunctional amine catalysts to facilitate curing of the silicone and epoxy film with small amounts of fluorocarbon copolymer embedded therein gives a low-temperature curing non-stick coating.

The teachings of the aforementioned U.S. Pat. Nos. 4,121,000 and 4,252,702 are incorporated herein by reference.

EXAMPLE

A coating composition is prepared by blending together the following ingredients, which are within the scope of the present invention:

| | |
|---|---|
| Polysiloxane Resin DC6-2230 (Dow Corning) | 26.00% |
| Xylene | 2.21% |
| Butyl Acetate | 24.41% |
| Cellosolve Acetate | 9.83% |
| DC200 Silicone Oil (Dow Corning) | 0.41% |
| Chrome Oxide Pigment | 7.96% |
| Carbon Black | 0.35% |
| Bentone Clay | 1.57% |
| Epon 828 Epoxy Resin (Shell Chemical Co.) | 4.32% |
| Methylisobutyl ketone | 9.31% |
| Diacetone Alcohol | 2.32% |
| Particulate Copolymer of 88% TFE, 12% HEP | 8.89% |
| Benzoguanamine Crosslinker | 2.13% |
| Diethylenetriamine | 0.30% |

The coating composition is then applied to a large steel drum up to 1 meter in diameter and 2 meters long, an insulating blanket is provided around the coated drum, and the temperature of the drum is raised to 107° C. by steam heating on the inside. That temperature is maintained for 24 hours. The result is a coherent, useful, non-stick coating on the drum. Such a drum can be used to compress a web of material at slighly elevated temperatures without the material sticking to the drum.

Other potential uses include many things for which non-stick coatings might be wanted on large object which is difficult to heat to high temperatures.

I claim:
1. A coating composition comprising:
(a) a binder comprised of

(1) 40–99%, based on the weight of the binder, of a polysiloxane resin-forming precondensate which has one or more of the units

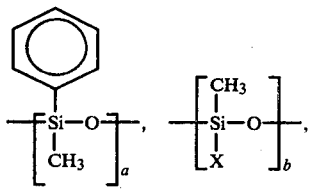

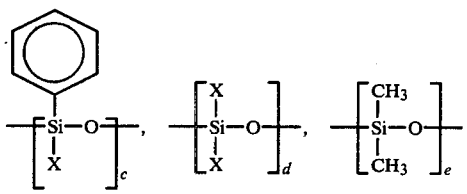

wherein
X is a functional group which allows crosslinking at its site, and
a, b, c, d and e are of a magnitude and in proporations which provide the resin with a degree of substitution, measured as the ratio of phenyl plus methyl groups to silicon atoms, of a least about 1.0, and a ratio of phenyl groups to silicon atoms of at least about 0.3, and which has a silanol content above 4%, based on the weight of the precondensate; and (2) 1–40%, based on the weight of the binder, of an epoxy resin having the formula

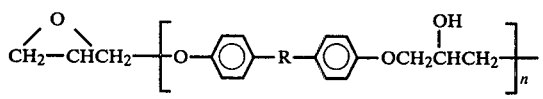

-continued

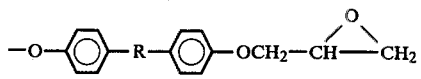

wherein
n is an integer from 0–42, and
R is an alkylene group of 1–4 carbon atoms;
(b) 5–60%, based on the weight of the binder, of a fluorocarbon copolymer of tetrafluoroethylene and hexafluoropropylene containing by weight about 8–25 mole percent hexafluoropropylene;
(c) 0.1–5%, based on the weight of the binder, of a multifunctional amine catalyst;
(d) 0.2–10%, based on the weight of the binder, of a silicone fluid which is a dimethyl polysiloxane fluid having a viscosity of 50–5000 centistokes measured at 25° C.; and
(e) a inert liquid carrier.

2. The coating composition of claim 1 wherein
(a) the binder is comprised of
(1) 80–90%, based on the weight of the binder, of said precondensate; and
(2) 10–20%, based on the weight of binder, epoxy resin;
and containing
(b) 25–35%, based on the weight of the binder, of said fluorocarbon copolymer which contains about 10–15 mole percent of hexafluoropropylene; and
(c) 1–3%, based on the weight of the binder, of diethylenetriamine.

3. The coating composition of claim 1 wherein
(a) the binder is comprised of
(1) about 84%, based on the weight of the binder, of said precondensate; and
(2) about 16%, based on the weight of binder, epoxy resin; and
and containing
(b) about 33%, based on the weight of the binder, of said fluorocarbon copolymer which contains about 12–13 mole % of hexafluoropropylene.

* * * * *